United States Patent
Shinoda et al.

(10) Patent No.: US 6,796,657 B2
(45) Date of Patent: Sep. 28, 2004

(54) PROJECTION TYPE DISPLAY APPARATUS

(75) Inventors: Makoto Shinoda, Tokyo (JP); Kenji Sugihara, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/331,018

(22) Filed: Dec. 27, 2002

(65) Prior Publication Data

US 2003/0151724 A1 Aug. 14, 2003

(30) Foreign Application Priority Data

Dec. 28, 2001 (JP) ........................................ 2001-400669

(51) Int. Cl.[7] ........................ G03B 21/00; G03B 21/14; G02F 1/03; H04N 9/07; F21V 9/00
(52) U.S. Cl. ............................ 353/31; 353/20; 353/33; 353/82; 353/84; 353/89; 359/256; 359/435; 359/634; 359/494; 359/577; 348/339; 348/57; 362/231; 362/293
(58) Field of Search ........................ 353/31, 20, 33–34, 353/82, 84, 88–89, 256, 435, 634, 490, 494, 577; 359/256, 435, 634, 490, 494, 577; 348/339, 57, 106, 5, 193; 362/231, 293; 349/57, 106, 5, 193

(56) References Cited

U.S. PATENT DOCUMENTS

| | | | |
|---|---|---|---|
| 6,191,894 B1 * | 2/2001 | Kitamura et al. | 359/676 |
| 6,473,244 B1 * | 10/2002 | Sugano | 359/794 |
| 6,559,900 B1 * | 5/2003 | Kanamori et al. | 349/5 |
| 6,565,213 B1 * | 5/2003 | Yamaguchi et al. | 353/33 |
| 6,582,081 B2 * | 6/2003 | Seo et al. | 353/20 |

* cited by examiner

Primary Examiner—Alan A. Mathews
Assistant Examiner—Magda Cruz
(74) Attorney, Agent, or Firm—Frommer Lawrence & Haug LLP; William S. Frommer; Bruno Polito (57) ABSTRACT

A projection type display apparatus including an illumination optical system for emitting a light flux, a decomposition optical system for decomposing the light flux into color lights of red, green and blue, liquid crystal light valves for the colors for receiving the decomposed color lights, a synthesis optical system for synthesizing the image lights of the colors from the liquid crystal light valves, and a projection optical system for projecting the synthesized image lights to a screen. A filter is disposed at one of positions opposing to each other across the center of the light flux between the white light source and the decomposition optical system and attenuates or cuts off light of a wavelength region different from that of light which passes the other of the positions.

8 Claims, 12 Drawing Sheets

PROJECTION TYPE DISPLAY APPARATUS

BACKGROUND OF THE INVENTION

This invention relates to a projection type display apparatus normally called liquid crystal projector in which a liquid crystal light valve is used.

Figure 11:
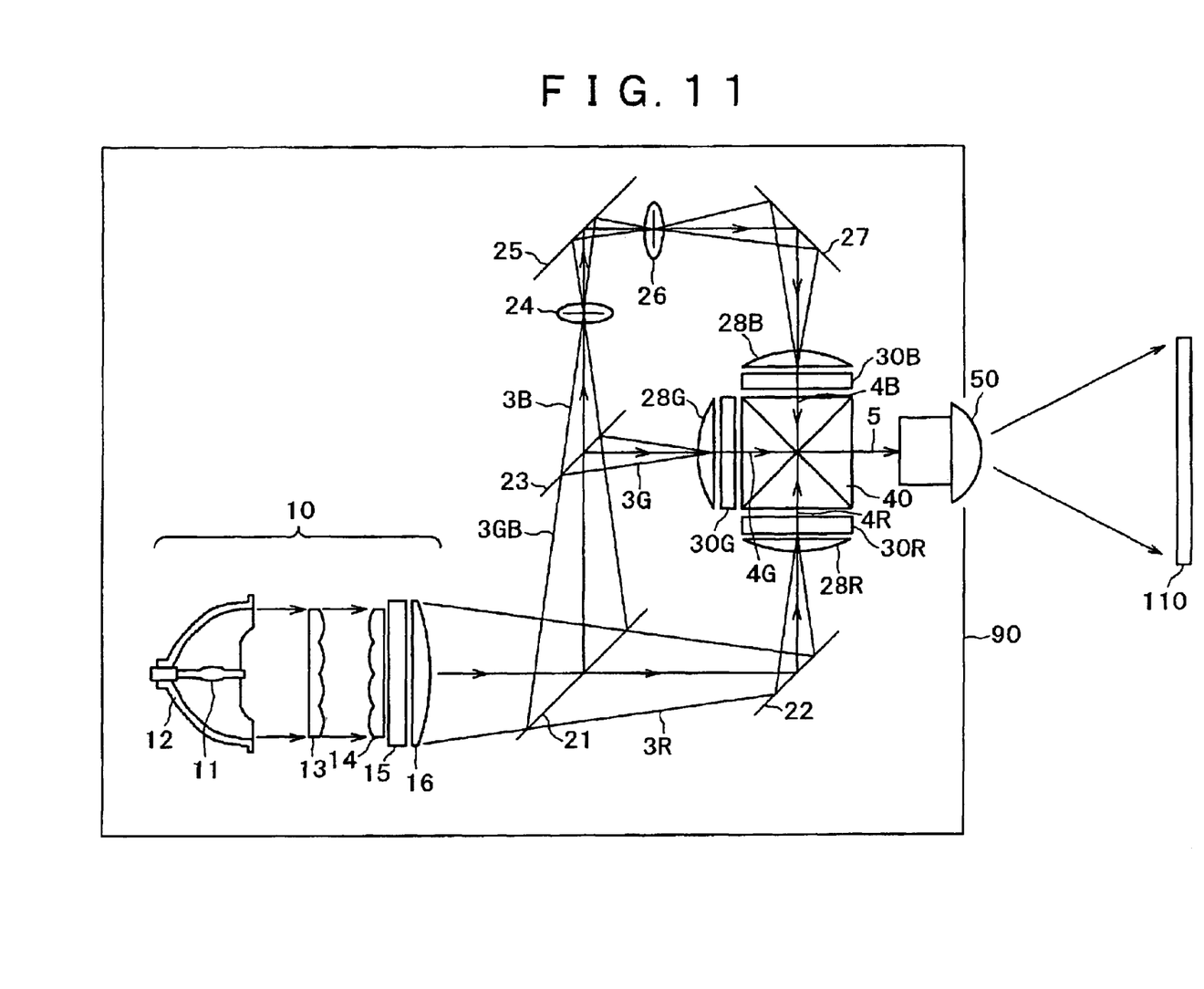
FIG. 11 is a schematic view showing an example of a conventional projection type display apparatus.

A projection type display apparatus in which a liquid crystal light valve is used is conventionally configured in such a manner as shown in FIG. 11.

Referring to FIG. 11, the projection type display apparatus 90 shown includes an illumination unit (illumination optical system) 10 wherein part of non-polarized white light from a white light source 11 directly passes, but the remaining part of the non-polarized white light is first reflected by a reflector 12 and then passes, through a pair of multi-lens arrays 13 and 14 disposed in an opposing relationship to each other so that they are converted into a light flux which has an intensity distribution uniform within a fixed region on a plane perpendicular to the center axis of the light flux. Further, the light flux is converted from non-polarized light into linearly polarized light by a polarizing conversion element 15 and goes out from the illumination unit 10 through a condenser lens 16.

The light flux going out from the illumination unit 10 is decomposed into red color light 3R, green and blue color light 3GB by a dichroic mirror 21, and the red color light 3R is reflected by a mirror 22 and introduced into a liquid crystal light valve 30R for red through a condenser lens 28R.

Meanwhile, the green and blue color light 3GB is decomposed into green color light 3G and blue color light 3B by a dichroic mirror 23, and the green color light 3G is introduced into a liquid crystal light valve 30G for green through a condenser lens 28G while the blue color light 3B is introduced into a liquid crystal light valve 30B for blue through a relay lens 24, a mirror 25, another relay lens 26, another mirror 27 and a condenser lens 28B.

The liquid crystal light valves 30R, 30G and 30B are each formed from a liquid crystal panel of the transmission type, and images are written into the liquid crystal light valves 30R, 30G and 30B with red, green and blue color signals, respectively.

The decomposed color lights 3R, 3G and 3B of red, green and blue are modulated and converted into image lights 4R, 4G and 4B of red, green and blue by the liquid crystal light valves 30R, 30G and 30B, respectively. The image lights 4R, 4G and 4B of red, green and blue are synthesized by a dichroic prism 40, and the image light 5 after the synthesis is projected in an enlarged scale on a screen 110 by a projection lens 50.

While FIG. 11 shows a display apparatus of the front projection type wherein the optical units from the illumination unit 10 to the projection lens 50 form the projection type display apparatus 90 separately from the screen 110, also optical units of a display apparatus of the back projection type wherein the optical units from the illumination unit to the projection lens and the screen are disposed in a cabinet are formed similarly as in the projection type display apparatus 90 of FIG. 11.

With the conventional projection type display apparatus described above, however, the contrast on the screen cannot be raised higher than a certain fixed value from a view angle of a liquid crystal panel which composes each of the liquid crystal light valves as described below.

Figure 12:
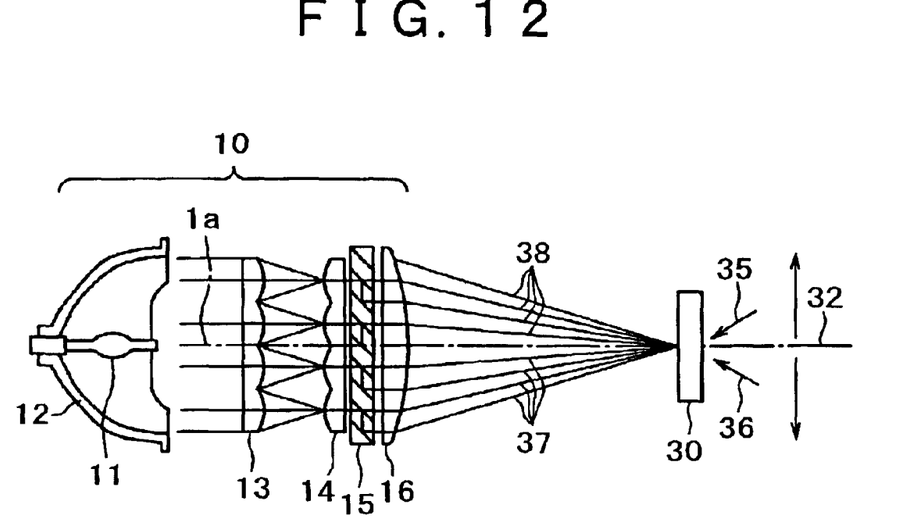
FIG. 12 is a view illustrating operation of the projection type display apparatus of FIG. 11.

FIG. 12 illustrates a manner wherein a light flux from the illumination unit 10 in the projection type display apparatus 90 of FIG. 11 is introduced into a liquid crystal light valve 30 in principle with the decomposition optical system omitted. Here, the liquid crystal light valve 30 is the liquid crystal light valve 30R, 30G or 30B for red, green or blue.

It is to be noted, however, that, while, in the projection type display apparatus 90 of FIG. 11, the lengths of the optical paths from the illumination unit 10 to the liquid crystal light valves 30R, 30G and 30B are set such that the optical paths for the red color light 3R and the green color light 3G are equal to each other but the optical path for the blue color light 3B is longer than those for the red color light 3R and the green color light 3G so that the length is unequal with regard to the blue color, it is assumed that, in FIG. 12, the optical path lengths from the illumination unit 10 to the liquid crystal light valve 30 are equal for the red, green and blue color lights for the convenience of description.

Usually, the size of the light exit of the illumination unit 10 is relatively greater than the aperture size of the liquid crystal light valve 30. Therefore, light emitted from the illumination unit 10 is introduced into the liquid crystal light valve 30 while being condensed, and as viewed from the liquid crystal light valve 30, the light is introduced from every direction within a certain angular range with respect to the direction of a normal 32 to the liquid crystal light valve 30.

However, since TN (Twisted Nematic) liquid crystal of the twisted light mode wherein the major axis of a liquid crystal molecule is twisted by 90° between the top and the bottom of the liquid crystal layer is used for a liquid crystal panel which composes the liquid crystal light valve 30, the light shutter characteristic differs depending upon the view angle.

Figure 13:
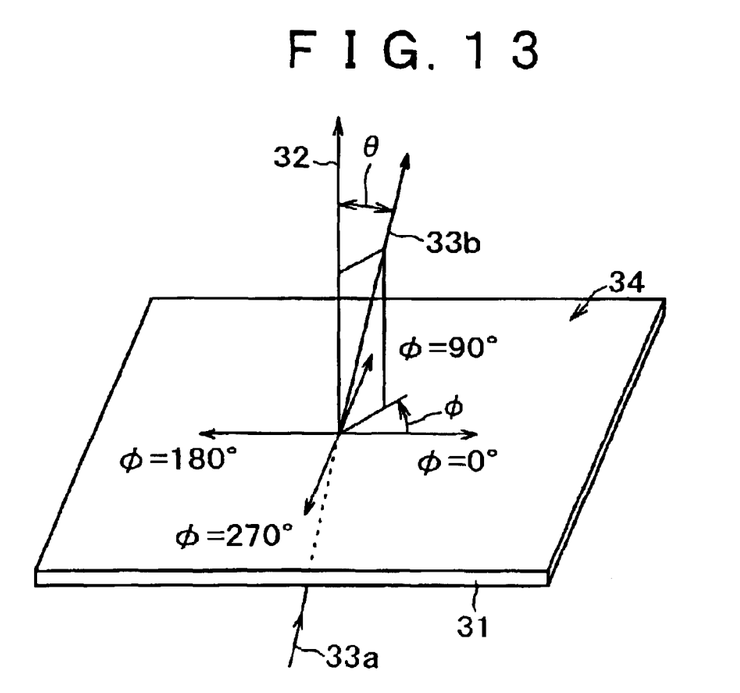
FIG. 13 is a schematic diagrammatic view illustrating a definition of a view angle.

As regards the view angle, as shown in FIG. 13, the angle φ of outgoing light 33b from the liquid crystal panel 31 originating from incoming light 33a to the liquid crystal panel 31 with respect to a reference azimuth on an outgoing face 34 of the liquid crystal panel 31 is defined as an azimuth angle, and an angle θ of the outgoing light 33b with respect to the normal 32 to the liquid crystal panel 31 is defined as a polar angle. As viewed on the display screen on the outgoing face 34, φ=0° corresponds to the rightward direction; φ=90° corresponds to the upward direction; φ=180° corresponds to the leftward direction; and φ=270° corresponds to the downward direction.

Figure 14:
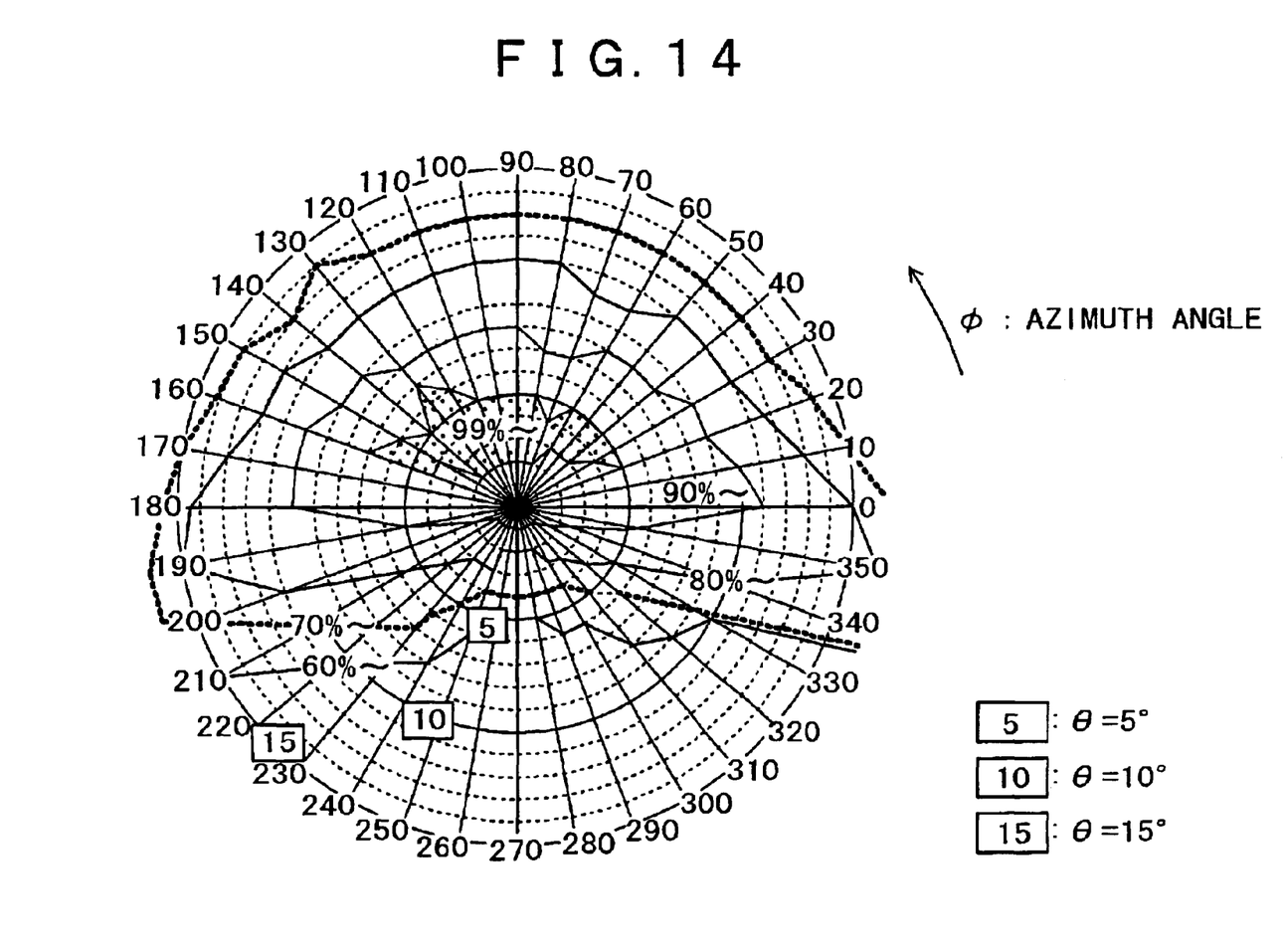
FIG. 14 is a diagrammatic view showing an example of a view angle characteristic of a liquid crystal panel.

FIG. 14 illustrates a result of measurement of the view angle dependency of the light cutoff rate which was performed while a certain liquid crystal panel was placed in an all-black state. The center of concentric circles corresponds to θ=0; the circle denoted by numeral 5 corresponds to θ=5°; the circle denoted by numeral 10 corresponds to θ=10°; and the circle denoted by numeral 15 corresponds to θ=15°.

The region indicated as "99% ~" is a view angle range within which light less then 1% is transmitted; the region indicated as "90% ~" is a view angle range within which light less than 10% is transmitted; the region indicated as "80% ~" and surrounded by a thick line is a view angle range within which light less than 20% is transmitted; and the region indicated as "70% ~" and surrounded by a broken line is a view angle range within which light less than 30% is transmitted.

Accordingly, with the liquid crystal panel shown, a sufficient light shutter function is exhibited and a high contrast is exhibited for any light flux 37 which penetrates the liquid crystal panel upwardly from below when the liquid crystal panel is viewed downwardly from above as indicated by an arrow mark 35 of FIG. 12 as viewed from the outgoing face 34 side shown in FIG. 13. However, the light shutter function is inferior and the contrast is low for any light flux 38 which penetrates the liquid crystal panel downwardly from above when the liquid crystal panel is viewed upwardly from below as indicated by an arrow mark 36 of FIG. 12.

Since the contrast on the screen is given by an arithmetic mean of contrasts of light fluxes introduced into the liquid crystal light valve 30, with the conventional projection type display apparatus described above, the contrast on the screen cannot be raised higher than a certain fixed value.

In order to solve the problem just described, it is disclosed to use an optical film having an optical anisotropy in Japanese Patent Laid-Open No. 222213. However, the optical film having an optical anisotropy is disadvantageous in that it is complicated in a method of production and is expensive and that the optical anisotropy changes if it is illuminated with intense light.

SUMMARY OF THE INVENTION

It is an object of the present invention to provide a projection type display apparatus which can maintain a high contrast for a long period of time and can be produced simply and at a low cost.

In order to attain the object described above, according to the present invention, there is provided a projection type display apparatus, including an illumination optical system for emitting light from a white light source as a light flux whose intensity distribution is uniformed, a decomposition optical system for decomposing the emitted light flux into color lights of red, green and blue, a plurality of liquid crystal light valves for the colors into which the decomposed color lights of the colors are introduced individually, a synthesis optical system for synthesizing the image lights of the colors emitted from the liquid crystal light valves for the colors, and a projection optical system for projecting the synthesized image lights to a screen, wherein a first optical path from the illumination optical system to one of the liquid crystal light valves for a predetermined one color through the decomposition optical system is formed longer than second optical paths to the liquid crystal light valves for the other two colors, and a filter is disposed at one of positions opposing to each other across the center of the light flux between the white light source and the decomposition optical system for attenuating or cutting off light of a wavelength region different from that of light which passes the other of the positions.

The projection type display apparatus is advantageous in that a high contrast can be maintained for a long period of time and it can be produced simply at a low cost.

The above and other objects, features and advantages of the present invention will become apparent from the following description and the appended claims, taken in conjunction with the accompanying drawings in which like parts or elements denoted by like reference symbols.

DESCRIPTION OF THE PREFERRED EMBODIMENTS

Figure 1:
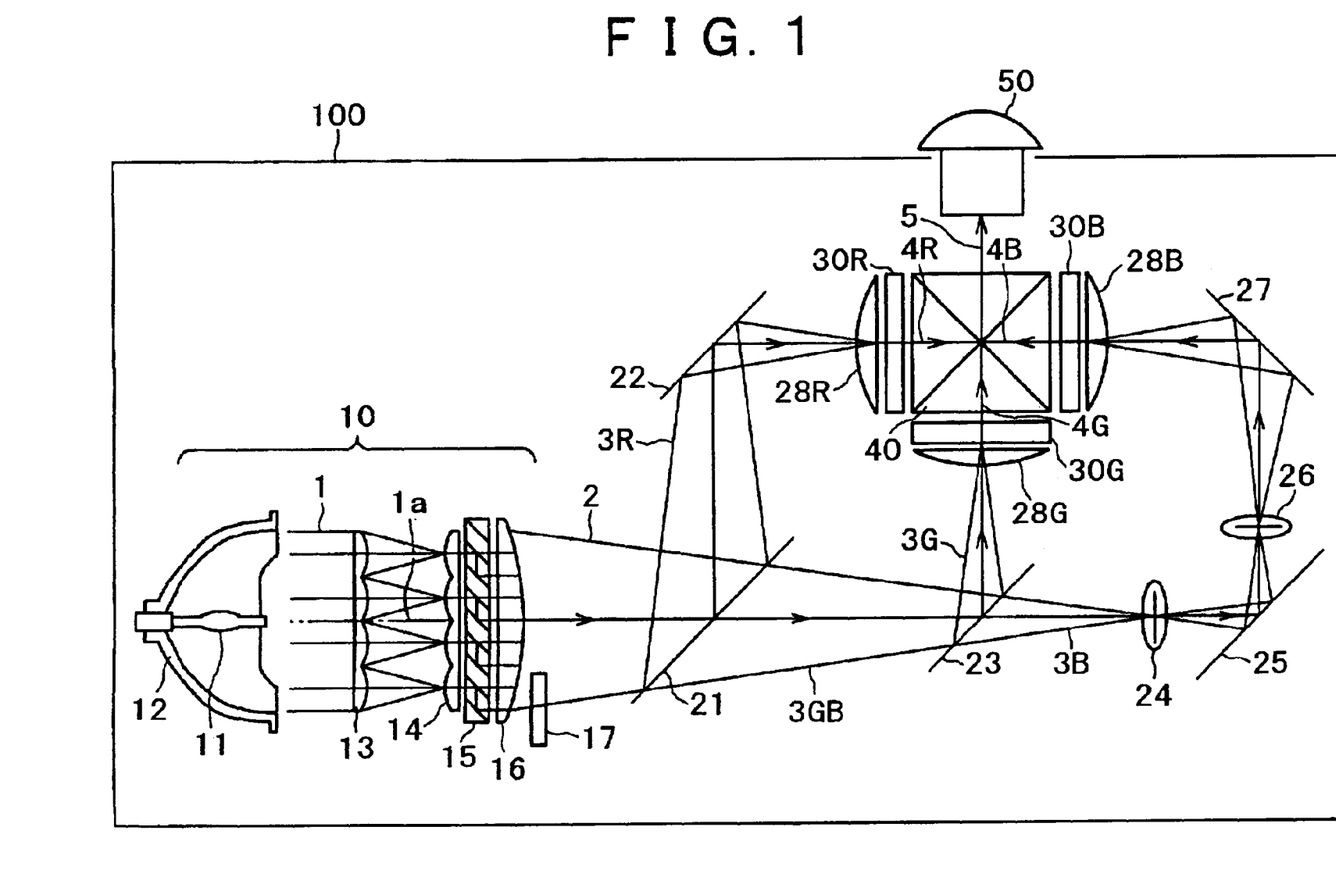
FIG. 1 is a schematic view showing a projection type display apparatus to which the present invention is applied.
Figure 2:
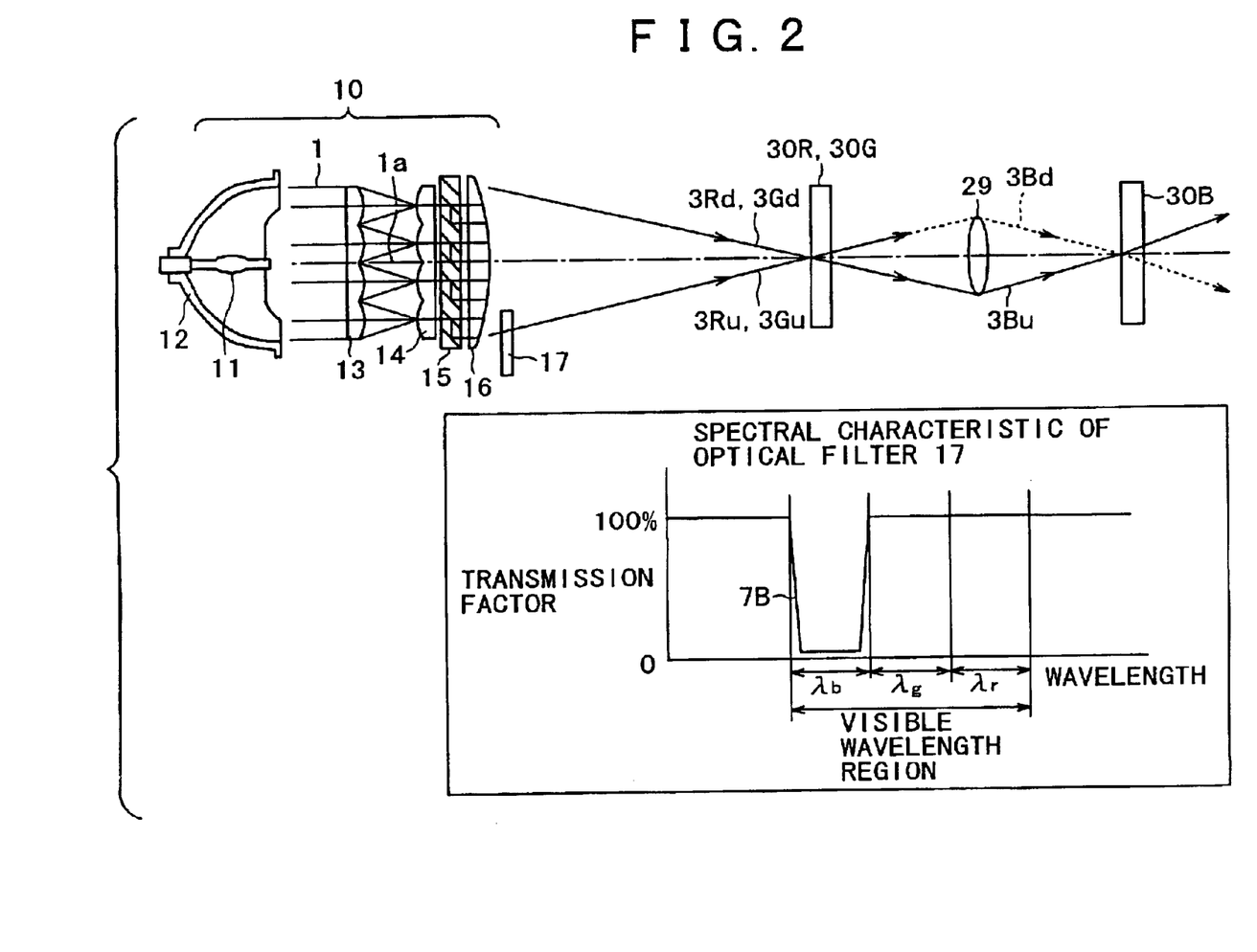
FIG. 2 is a schematic and diagrammatic view illustrating operation of the projection type display apparatus of FIG. 1.

[First Embodiment: FIGS. 1 and 2]

FIG. 1 shows a projection type display apparatus to which the present invention is applied.

Referring to FIG. 1, the projection type display apparatus 100 of the present embodiment has a similar configuration to that of the projection type display apparatus 90 shown in FIG. 11 except that an optical filter 17 is disposed in such a manner as hereinafter described. In particular, the projection type display apparatus 100 includes an illumination unit 10 wherein part of non-polarized white light from a white light source 11 directly passes, but the remaining part of the non-polarized white light is first reflected by a reflector 12 and then passes, as a light flux 1 through a pair of multi-lens arrays 13 and 14 disposed in an opposing relationship to each other so that the light flux 1 is converted into a light flux which has an intensity distribution uniform within a fixed region on a plane perpendicular to the center axis 1a of the light flux. Further, the light flux is converted from non-polarized light into linearly polarized light by a polarizing conversion element 15 and goes out from the illumination unit 10 through a condenser lens 16.

The light flux 2 going out from the illumination unit 10 is decomposed into red color light 3R and green and blue color light 3GB by a dichroic mirror 21, and the red color light 3R is reflected by a mirror 22 and introduced into a liquid crystal light valve 30R for red through a condenser lens 28R.

Meanwhile, the green and blue color light 3GB is decomposed into green color light 3G and blue color light 3B by a dichroic mirror 23, and the green color light 3G is introduced into a liquid crystal light valve 30G for green through a condenser lens 28G while the blue color light 3B is introduced into a liquid crystal light valve 30B for blue through a relay lens 24, a mirror 25, another relay lens 26, another mirror 27 and a condenser lens 28B.

The decomposed color lights 3R, 3G and 3B of red, green and blue are modulated and converted into image lights 4R, 4G and 4B of red, green and blue by the liquid crystal light valves 30R, 30G and 30B, respectively. The image lights 4R, 4G and 4B of red, green and blue are synthesized by a dichroic prism 40, and the image light 5 after the synthesis is projected in an enlarged scale on a screen 110 by a projection lens 50.

A liquid crystal panel which composes each of the liquid crystal light valves 30R, 30G and 30B exhibits a sufficient light shutter function for any light flux which penetrates the liquid crystal panel upwardly from below when the liquid crystal panel is viewed downwardly from above, but exhibits an inferior light shutter function for any light flux which penetrates the liquid crystal panel downwardly from above when the liquid crystal panel is viewed upwardly from below, like the view angle characteristic of FIG. 14.

In the projection type display apparatus 100 of the present embodiment, as the optical filter 17, a filter which cuts off the wavelength region λb of blue of an unequal length but transmits therethrough the wavelength region λg of green and the wavelength region λr of red as indicated by a spectral characteristic 7B of FIG. 2 is disposed at a lower position adjacent a light exit of the illumination unit 10. Here, the optical filter 17 may otherwise attenuate part of the wavelength region λb of blue in place of cutting off the wavelength region λb of blue.

FIG. 2 illustrates a manner wherein a light flux from the illumination unit 10 in the projection type display apparatus 100 of FIG. 1 is introduced into the liquid crystal light valves 30R, 30G and 30B in principle with the decomposition optical system omitted. A lens 29 corresponds to the relay lenses 24 and 26 of FIG. 1. Incidentally, the lens 29 (relay lenses 24 and 26) introduces light from the illumination unit 10 so that the range within which the liquid crystal light valve 30B is illuminated by the illumination unit 10 may be substantially equal to those of the liquid crystal light valves 30R and 30G.

As shown in FIG. 2, in the projection type display apparatus 100 of FIG. 1, a light flux emitted from an upper position of the light exit of the illumination unit 10 is introduced as light fluxes 3Rd and 3Gd, which penetrate downwardly from above, into the liquid crystal light valves 30R and 30G for red and green, but introduced as a light flux 3Bu, which penetrates upwardly from below in a reversed vertical relationship, into the liquid crystal light valve 30B for blue. Meanwhile, a light flux emitted from a lower position of the light exit of the illumination unit 10 is introduced as light fluxes 3Ru and 3Gu, which penetrate upwardly from below, into the liquid crystal light valves 30R and 30G for red and green, but introduced, if the optical filter 17 is not present, as a light flux 3Bd, which penetrates downwardly from above in a reversed vertical relationship, into the liquid crystal light valve 30B for blue.

However, the optical filter 17 for cutting off only the wavelength region λb of blue is disposed at the lower position adjacent the light exit of the illumination unit 10.

Therefore, blue light components in the light flux emitted from the lower position of the light exit of the illumination unit 10 are cut off, and consequently, the blue color light 3B is prevented from being introduced as a light flux 3Bd, which penetrates downwardly from above and gives rise to a drop of the contrast, into the liquid crystal light valve 30B for blue.

Since blue light components in the light flux emitted from the upper position of the light exit of the illumination unit 10 are not cut off by the optical filter 17, the blue color light 3B is introduced as a light flux 3Bu, which penetrates upwardly from below and increases the contrast, into the liquid crystal light valve 30B for blue.

Accordingly, the contrast of blue on the screen as an arithmetic mean of contrasts of the light fluxes introduced into the liquid crystal light valve 30B is improved. In this instance, although the amount of incoming light to the liquid crystal light valve 30B decreases, the decreasing amount can be suppressed to the minimum.

Red right components and green light components in the light flux emitted from the lower position of the light exit of the illumination unit 10 are not influenced by the optical filter 17, and the contrasts of red and green on the screen do not vary.

The optical filter 17 can be formed in multiple layers including low refraction factor material layers and high refraction factor material layers layered alternately on a transparent substrate and can be manufactured simply and at a low cost. Besides, an inorganic material which is stable against light such as SiO2 or TiO2 can be used as the material for the optical filter 17, and even if intense light is irradiated on the optical filter 17 for a long period of time, the spectral characteristic of the optical filter 17 does not vary.

Accordingly, with the projection type display apparatus of the present embodiment, a high contrast can be maintained for a long period of time and the projection type display apparatus 100 can be manufactured simply at a low cost.

Figure 3:
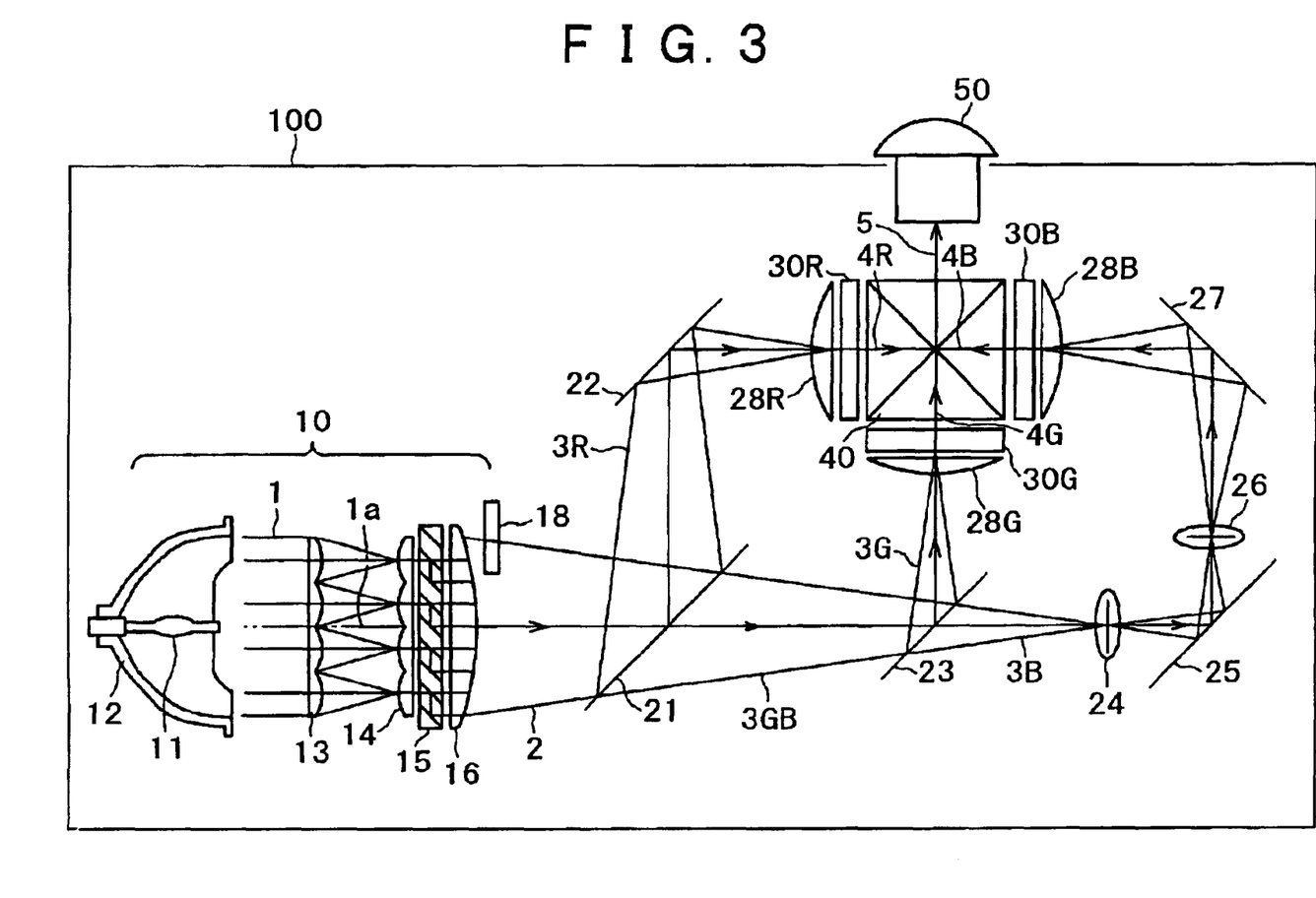
FIG. 3 is a schematic view showing another projection type display apparatus to which the present invention is applied.
Figure 4:
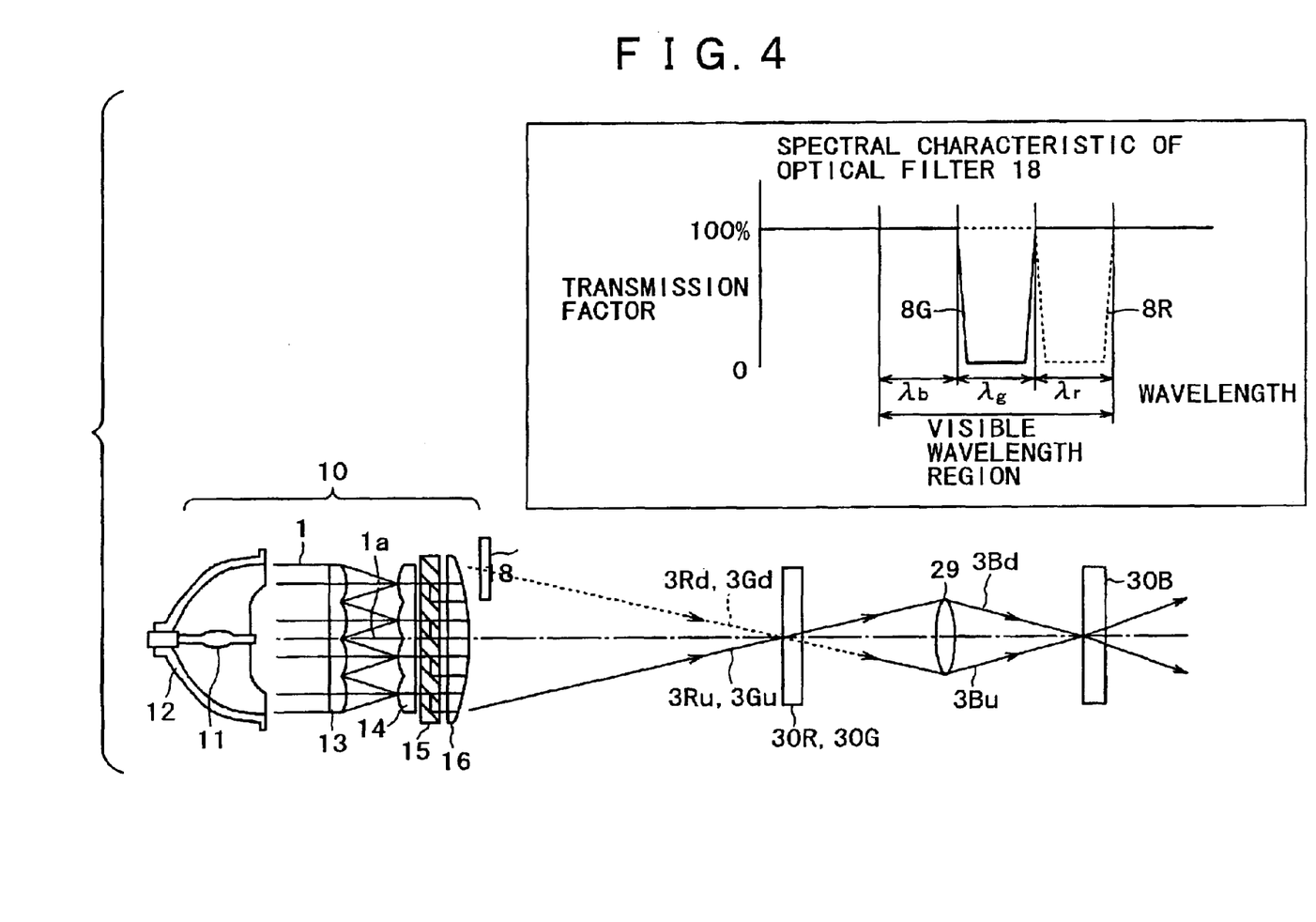
FIG. 4 is a schematic and diagrammatic view illustrating operation of the projection type display apparatus of FIG. 3.

[Second Embodiment: FIGS. 3 and 4]

FIG. 3 shows another projection type display apparatus to which the present invention is applied.

The projection type display apparatus 100 of the present embodiment has a similar configuration to that of the projection type display apparatus 100 of FIG. 1 except that an optical filter 18 is disposed in place of the optical filter 17 of FIG. 1.

In the projection type display apparatus 100 of the present embodiment, a filter for cutting off the wavelength region λg of green but transmitting therethrough the wavelength region λb of blue and the wavelength region λr of red as indicated by a spectral characteristic 8G of FIG. 4 or another filter for cutting off the wavelength region λr of red but transmitting therethrough the wavelength region λb of blue and the wavelength region λg of green as indicated by a spectral characteristic 8R of FIG. 4 is disposed as the optical filter 18 at an upper position adjacent the light exit of the illumination unit 10. Here, the filter for cutting off the wavelength region λg of green as indicated by the spectral characteristic 8G may be replaced by a filter which attenuates part of the wavelength region λg of green. Further, the filter for cutting off the wavelength region λr of red as indicated by the spectral characteristic 8R may be replaced by a filter which attenuates part of the wavelength region λr of red.

FIG. 4 illustrates, similarly to FIG. 2, a manner wherein a light flux from the illumination unit 10 in the projection type display apparatus 100 of FIG. 3 is introduced into the liquid crystal light valves 30R, 30G and 30B in principle with the decomposition optical system omitted.

As shown in FIG. 4, in the projection type display apparatus 100 of FIG. 3, a light flux emitted from a lower position of the light exit of the illumination unit 10 is introduced as light fluxes 3Ru and 3Gu, which penetrate upwardly from below, into the liquid crystal light valves 30R and 30G for red and green, but introduced as a light flux 3Bd, which penetrates downwardly from above in a reversed vertical relationship, into the liquid crystal light valve 30B for blue. Meanwhile, a light flux emitted from an upper position of the light exit of the illumination unit 10 is introduced as light fluxes 3Rd and 3Gd, which penetrate downwardly from above, into the liquid crystal light valves 30R and 30G for red and green, but introduced as a light flux 3Bu, which penetrates upwardly from below in a reversed vertical relationship, into the liquid crystal light valve 30B for blue.

However, the optical filter 18 for cutting off only the wavelength region λg of green or the wavelength region λr of red is disposed at the upper position adjacent the light exit of the illumination unit 10.

Accordingly, where a filter for cutting off only the wavelength region λg of green is disposed as the optical filter 18, then green light components in the light flux emitted from the upper position of the light exit of the illumination unit 10 are cut off, and consequently, the green color light 3G is prevented from being introduced as a light flux 3Gd, which penetrates downwardly from above and gives rise to a drop of the contrast, into the liquid crystal light valve 30G for green.

Since green light components in the light flux emitted from the lower position of the light exit of the illumination unit 10 are not cut off by the optical filter 18, the green color light 3G is introduced as a light flux 3Gu, which penetrates upwardly from below and increases the contrast, into the liquid crystal light valve 30G for green.

Accordingly, the contrast of green on the screen as an arithmetic mean of contrasts of the light fluxes introduced into the liquid crystal light valve 30G is improved. Also in this instance, the decreasing amount of incoming light to the liquid crystal light valve 30G can be suppressed to the minimum.

Blue right components and red light components in the light flux emitted from the upper position of the light exit of the illumination unit 10 are not influenced by the optical filter 18, and the contrasts of blue and red on the screen do not vary.

Where a filter for cutting off only the wavelength region λr of red is disposed as the optical filter 18, the contrast of red on the screen is improved similarly as described hereinabove.

The projection type display apparatus of the present embodiment may be modified such that a filter for cutting off the wavelength region λg of green and the wavelength region λr of red but transmitting therethrough the wavelength region λb of blue is disposed as the optical filter 18. In this instance, as apparent from the foregoing description, the contrasts of green and red on the screen are improved.

[Third Embodiment: FIGS. 5 to 8]

Figure 5:
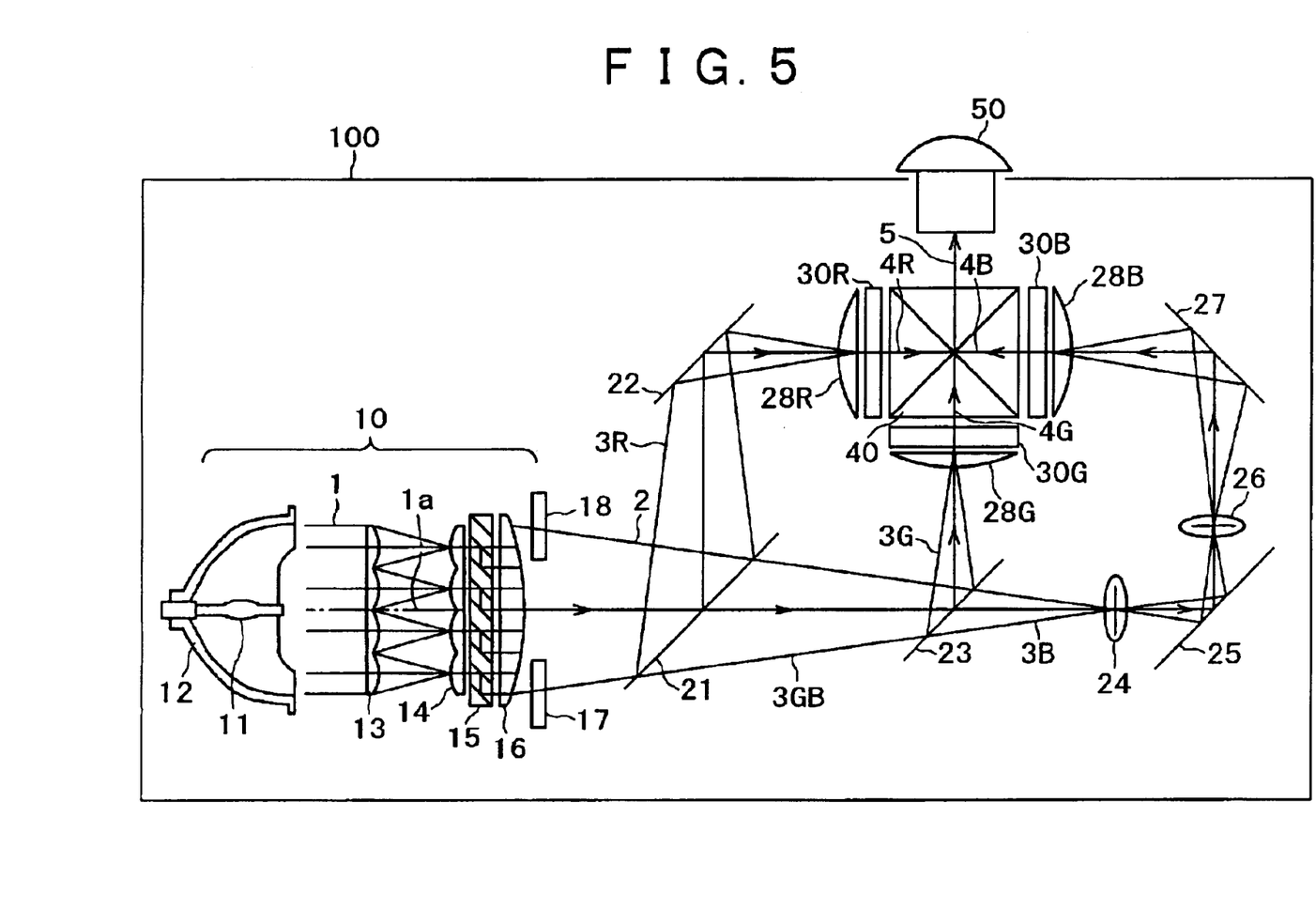
FIG. 5 is a view showing a modification to the projection type display apparatus of FIGS. 1 and 3.

FIG. 5 shows a further projection type display apparatus to which the present invention is applied.

Referring to FIG. 5, the projection type display apparatus 100 is a modification to both of the projection type display apparatus of the first and second embodiments described hereinabove with reference to FIGS. 1 and 3. More particularly, the projection type display apparatus 100 of the present embodiment is a combination of the projection type display apparatus of the first and second embodiments wherein the optical filter 17 is disposed at a lower position and the optical filter 18 are disposed at an upper position adjacent the light exit of the illumination unit 10.

Figure 6:
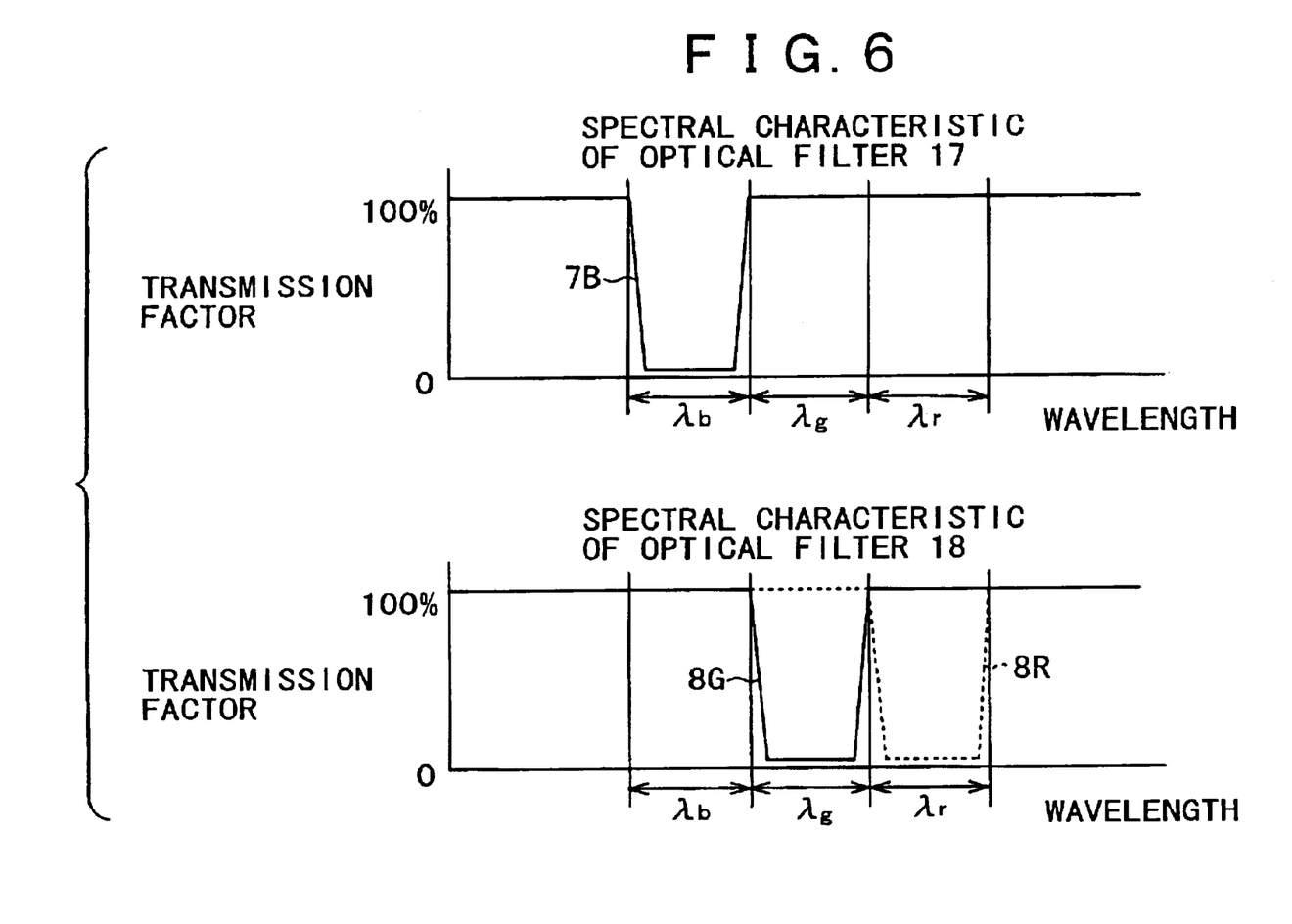
FIGS. 6 and 7 are diagrams illustrating different examples of spectral characteristics of optical filters in the projection type display apparatus of FIG. 5.

As an example, a filter for cutting off only the wavelength region λb of blue as indicated by a spectral characteristic 7B of FIG. 6 is disposed as the optical filter 17 while another filter for cutting off only the wavelength region λg of green or the wavelength region λr of red as indicated by a spectral characteristic 8G or 8R of FIG. 6 is disposed as the optical filter 18.

Figure 7:
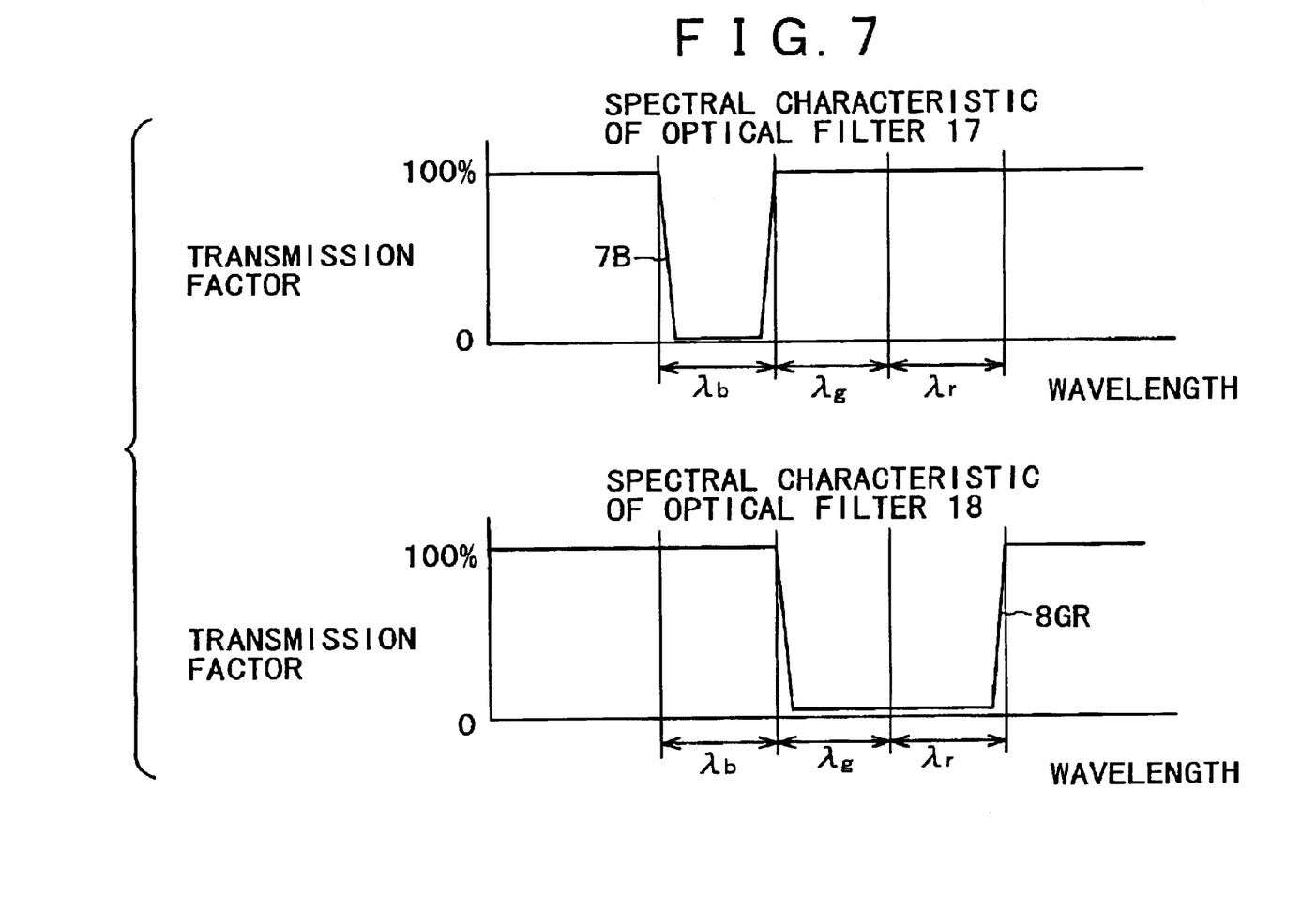

As another example, a filter for cutting off only the wavelength region λb of blue as indicated by a spectral characteristic 7B of FIG. 7 is disposed as the optical filter 17 while another filter for cutting off the wavelength region λg of green and the wavelength region λr of red as indicated by a spectral characteristic 8GR of FIG. 7 is disposed as the optical filter 18.

Figure 8:
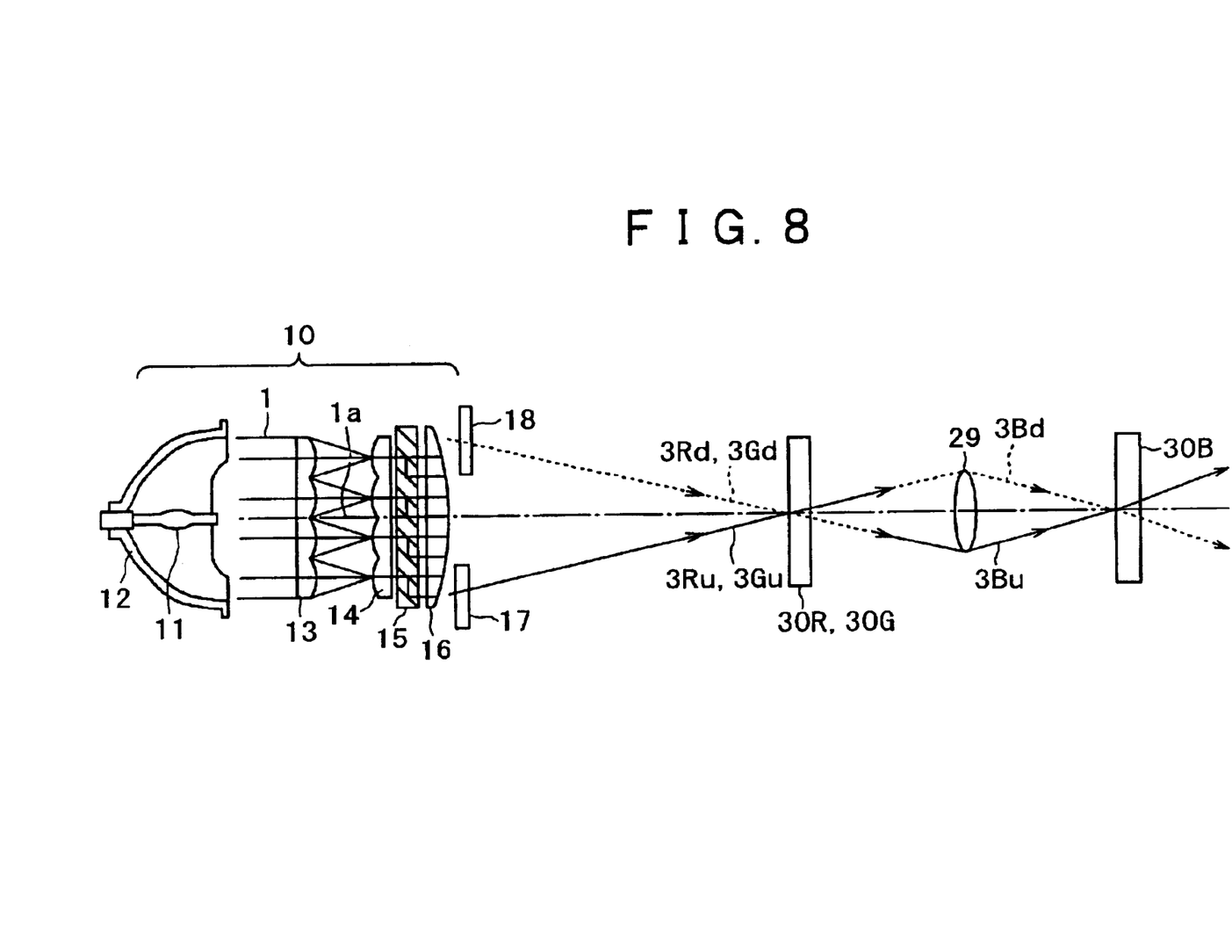
FIG. 8 is a schematic view illustrating operation of the projection type display apparatus of FIG. 5.

FIG. 8 illustrates, similarly to FIGS. 2 and 4, a manner wherein a light flux from the illumination unit 10 in the projection type display apparatus 100 of FIG. 5 is introduced into the liquid crystal light valves 30R, 30G and 30B in principle with the decomposition optical system omitted.

With the projection type display apparatus 100 of the present embodiment, the contrast of blue on the screen is improved similarly as with the projection type display apparatus 100 of the embodiment of FIG. 1, and the contrast of green or red or the contrasts of green and red on the screen are improved in accordance with the spectral characteristic of the optical filter 18 similarly as with the projection type display apparatus 100 of the embodiment of FIG. 3.

Particularly where a filter for cutting off the wavelength region λg of green and the wavelength region λr of red is disposed as the optical filter 18, the contrast on the screen is improved with regard to all of blue, green and red.

[Other Embodiments]

The optical filter 17 or 18 may not be disposed adjacent the light exit of the illumination unit 10, but be disposed as such a multi-layer film as described above formed on the light emitting face of the condenser lens 16 or be disposed otherwise on the light incoming side of the multi-lens array 13, between the multi-lens array 13 and the multi-lens array 14, between the multi-lens array 14 and the polarizing conversion element 15, or between the polarizing conversion element 15 and the condenser lens 16, or the like.

Where the optical filters 17 and 18 are disposed in such a manner as in the projection type display apparatus 100 of the embodiment of FIG. 5, they may be disposed in an opposing relationship to each other in an oblique direction across the light flux center axis 1a such that one of them is disposed adjacent the light exit of the illumination unit 10 while the other is disposed on the light incoming side of the multi-lens array 13.

Where a liquid crystal panel which composes each of the liquid crystal light valves 30R, 30G and 30B has such a view angle characteristic that, conversely to that of the projection type display apparatus 100 of the embodiments described hereinabove, it exhibits a sufficient light shutter function for any light flux which penetrates the liquid crystal panel downwardly from above when the liquid crystal panel is viewed upwardly from below, but exhibits an inferior light shutter function for any light flux which penetrates the liquid crystal panel upwardly from below when the liquid crystal panel is viewed downwardly from above, the optical filter 17 is disposed at a higher position than the light flux center axis 1a such as an upper position adjacent the light exit of the illumination unit 10 while the optical filter 18 is disposed at a lower position than the light flux center axis 1a such as a lower position adjacent the light exit of the illumination unit 10 conversely to those in the projection type display apparatus 100 of the embodiments described hereinabove.

On the other hand, when the liquid crystal panel is viewed from the light emitting face, where a liquid crystal panel which composes each of the liquid crystal light valves 30R, 30G and 30B has such a view angle characteristic that it exhibits a sufficient light shutter function for any light flux which penetrates the liquid crystal panel leftwardly from the right when the liquid crystal panel is viewed rightwardly from the left, but exhibits an inferior light shutter function for any light flux which penetrates the liquid crystal panel rightwardly from the left when the liquid crystal panel is viewed leftwardly from the right, or has an opposite view angle characteristic, the optical filter 17 is disposed at a leftward position or a rightward position with respect to the light flux center axis 1a while the optical filter 18 is disposed at a rightward position or a leftward position with respect to the light flux center axis 1a conversely.

While the projection type display apparatus 100 of the embodiments described above has an unequal length for the optical path for blue, alternatively the optical path for green or for red may have an unequal length.

Figure 9:
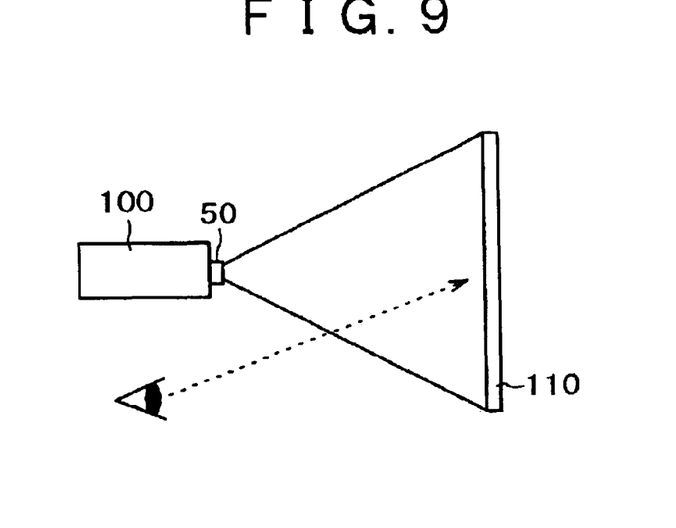
FIG. 9 is a schematic view showing an example of a projection type display apparatus of the front projection type.
Figure 10:
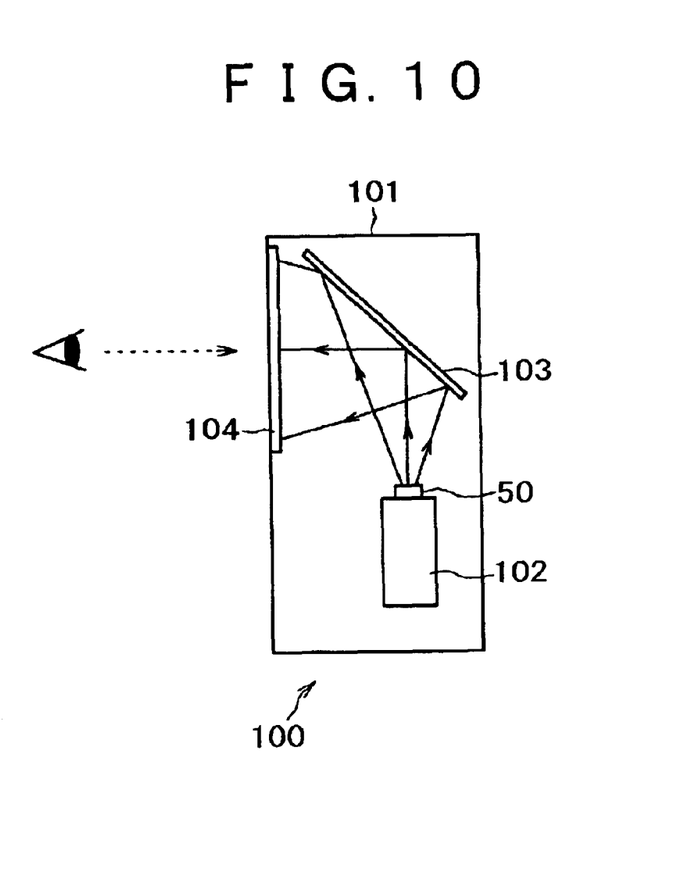
FIG. 10 is a schematic view showing an example of a projection type display apparatus of the rear projection type.

Further, while the embodiments described above are directed to a front projection type display apparatus wherein the projection type display apparatus 100 and the screen 110 are formed separately from each other as shown in FIG. 9, the present invention can be applied also to a back projection type display apparatus wherein a display apparatus unit 102, reflecting mirror 103 and screen 104 which correspond to the projection type display apparatus 100 of FIG. 9 are disposed in a cabinet 101 as shown as a projection type display apparatus 100 in FIG. 10.

[Verification of the Invention]

With regard to a comparative example wherein none of the optical filter 17 and the optical filter 18 is disposed in the projection type display apparatus 100 shown in FIG. 1, 3 or 5 and embodiments wherein the optical filter 17 or 18 or the optical filters 17 and 18 are disposed in the projection type display apparatus 100 shown in FIGS. 1, 3 and 5, the contrast on the screen was measured to verify effects of the present invention.

For the measurement of the contrast, signals were inputted to the liquid crystal light valves 30R, 30G and 30B to project an all-white state image and an all-black state mage on the screen, and the luminance Yw in the all-white state and the luminance Yk in the all-black state were measured at the position of the center of the screen by a luminance meter to determine a contrast ratio (Yw:Yk) to calculate a contrast value (Yw/Yk). It is determined that the higher the contrast value, the higher the contrast and the better the picture quality.

COMPARATIVE EXAMPLE

With the comparative example, the contrast value was 400.

IMPLEMENTATION EXAMPLE 1

In the implementation example 1, the optical filter 17 in the projection type display apparatus 100 of the embodiment of FIG. 1 cuts off only the wavelength region λb of blue. In this instance, the contrast value was 450.

IMPLEMENTATION EXAMPLE 2

In the implementation example 2, the optical filter 18 in the projection type display apparatus 100 of the embodiment of FIG. 3 cuts off only the wavelength region λg of green. In this instance, the contrast value was 500.

IMPLEMENTATION EXAMPLE 3

In the implementation example 3, the optical filter 18 in the projection type display apparatus 100 of the embodiment of FIG. 3 cuts off only the wavelength region λr of red. In this instance, the contrast value was 470.

IMPLEMENTATION EXAMPLE 4

In the implementation example 4, the optical filter 17 in the projection type display apparatus 100 of the embodiment of FIG. 5 cuts off only the wavelength region λb of blue and the optical filter 18 cuts off only the wavelength region λg of green. In this instance, the contrast value was 550.

IMPLEMENTATION EXAMPLE 5

In the implementation example 5, the optical filter 17 in the projection type display apparatus 100 of the embodiment of FIG. 5 cuts off only the wavelength region λb of blue and the optical filter 18 cuts off the wavelength region λg of green and the wavelength region λr of red. In this instance, the contrast value was 600.

While preferred embodiments of the present invention have been described using specific terms, such description is for illustrative purposes only, and it is to be understood that changes and variations may be made without departing from the spirit or scope of the following claims.

What is claimed is:

1. A projection type display apparatus, comprising:
   an illumination optical system for emitting light from a white light source as a light flux whose intensity distribution is uniformed;
   a decomposition optical system for decomposing the emitted light flux into color lights of red, green and blue;
   a plurality of liquid crystal light valves for the colors into which the decomposed color lights of the colors are introduced individually;
   a synthesis optical system for synthesizing the image lights of the colors emitted from said liquid crystal light valves for the colors; and
   a projection optical system for projecting the synthesized image lights to a screen;
   wherein a first optical path from said illumination optical system to one of said liquid crystal light valves for a predetermined one color through said decomposition optical system is formed longer than second optical paths to the liquid crystal light valves for the other two colors; and
   a filter is disposed at one of positions opposing to each other diametrically across the axis defining the center of the light flux between said white light source and said decomposition optical system for attenuating or cutting off light of a wavelength region different from that of light which passes the other of the positions.

2. A projection type display apparatus according to claim 1, wherein the one of said positions is a position corresponding to that of the light introduced into said liquid crystal light valve for the predetermined one color which is introduced from the side on which the light shutter function is inferior, and at the position, a first filter for attenuating or cutting off light of a wavelength region introduced into said liquid crystal light valve for the predetermined one color but passing therethrough light of wavelength regions introduced into said liquid crystal light valves for the other two colors is disposed as said filter.

3. A projection type display apparatus according to claim 2, wherein said first filter attenuates or cuts off light of the wavelength region of blue but passes therethrough light of the wavelength regions of red and green.

4. A projection type display apparatus according to claim 1, wherein the other of the positions is a position corresponding to that of the light introduced into said liquid crystal light valves for the other colors which is introduced from the side on which the light shutter function is inferior, and at the position, a second filter for attenuating or cutting off light of one or both of wavelength regions introduced into said liquid crystal light valves for the other two colors but passing therethrough light of a wavelength region introduced into said liquid crystal light valve for the predetermined one color is disposed as said filter.

5. A projection type display apparatus according to claim 4, wherein said second filter attenuates or cuts off light at least of the wavelength region of red or green but passes therethrough light of the wavelength region of blue.

6. A projection type display apparatus according to claim 1, further comprising a relay optical system disposed on said first optical path for introducing light so that a range within which the light flux from said illumination optical system illuminates said liquid crystal light valve for the predetermined one color may be substantially same as a range within which the light flux from said illumination optical system illuminates said liquid crystal light valves for the other two colors on said second light path.

7. A projection type display apparatus according to claim 1, wherein said illumination optical system includes a reflector for reflecting the light from said white light source to output the light as substantially parallel light, and a pair of multi-lens arrays for emitting the substantially parallel light from said reflector as a light flux whose intensity distribution is uniformed.

8. A projection type display apparatus according to claim 7, wherein said filter is disposed in the proximity of the side from which the light flux of said pair of multi-lens arrays is emitted.

* * * * *